US009534945B2

(12) United States Patent
Vander Horst (10) Patent No.: US 9,534,945 B2
(45) Date of Patent: *Jan. 3, 2017

(54) ROTARY VALVE MULTI-TANK INDIRECT LIQUID LEVEL MEASUREMENT SYSTEM AND METHOD FOR WASTEWATER TANKS IN A RECREATIONAL VEHICLE

(71) Applicant: John Vander Horst, Littleton, CO (US)

(72) Inventor: John Vander Horst, Littleton, CO (US)

( * ) Notice: Subject to any disclaimer, the term of this patent is extended or adjusted under 35 U.S.C. 154(b) by 69 days.

This patent is subject to a terminal disclaimer.

(21) Appl. No.: 14/545,056

(22) Filed: Mar. 20, 2015

(65) Prior Publication Data

US 2015/0198475 A1  Jul. 16, 2015

Related U.S. Application Data

(63) Continuation-in-part of application No. 13/573,541, filed on Sep. 21, 2012, now Pat. No. 9,134,163.

(51) Int. Cl.
*G01F 23/14* (2006.01)
*G01F 23/00* (2006.01)

(52) U.S. Cl.
CPC ............... *G01F 23/14* (2013.01); *G01F 23/00* (2013.01)

(58) Field of Classification Search
CPC ................................. G01F 23/14; G01F 23/00
USPC .......................................................... 73/302
See application file for complete search history.

(56) References Cited

U.S. PATENT DOCUMENTS

| | | | |
|---|---|---|---|
| 867,994 A | | 10/1907 | Murphy |
| 1,294,939 A | * | 2/1919 | Murphy ................ G01F 23/167 73/302 |
| 1,623,832 A | | 4/1927 | Durant |
| 1,670,207 A | | 5/1928 | Murphy |
| 2,518,484 A | * | 8/1950 | Matthews ............. G01F 23/165 73/302 |
| 3,587,316 A | | 6/1971 | Kapteyn |
| 4,064,752 A | * | 12/1977 | Murphy, Jr. .......... G01F 23/167 73/302 |
| 4,147,893 A | * | 4/1979 | Matson .................... B67D 7/06 379/106.07 |
| 4,665,746 A | * | 5/1987 | Sheppard ............. G01F 23/167 137/625.46 |
| 5,207,251 A | | 5/1993 | Cooks |
| 5,484,336 A | | 1/1996 | McConnell |
| 6,467,343 B1 | | 10/2002 | Baird |
| 6,510,736 B1 | | 1/2003 | Van Ee |
| 7,389,688 B1 | | 6/2008 | Vander Horst |

* cited by examiner

Primary Examiner — Hezron E Williams
Assistant Examiner — Marrit Eyassu (57) ABSTRACT

A multi-tank indirect liquid level measurement device and method for wastewater tanks in a recreational vehicle may be implemented using a sealable reservoir that holds pressurized air, a manual piston pump that supplies and/or pressurizes the air in the reservoir, a rotary valve that incorporates a selection disk with an axial passage that is rotationally coupled to a connection disk that has a plurality of pipes, each of which connect on their other end to the wastewater tanks to be gaged. A bourdon tube pressure gage displays the pressure difference between the sealable reservoir and atmospheric pressure, which is an indirect reading of the height of the wastewater in the tank being gaged.

20 Claims, 11 Drawing Sheets

ROTARY VALVE MULTI-TANK INDIRECT LIQUID LEVEL MEASUREMENT SYSTEM AND METHOD FOR WASTEWATER TANKS IN A RECREATIONAL VEHICLE

This application claims priority of application Ser. No. 13/573,541 filed Sep. 21, 2012, the entire contents of which are incorporated herein by reference.

BACKGROUND

This disclosure relates to the measurement of liquid levels in recreational vehicle wastewater holding tanks.

Many recreational vehicles, such as campers, trailers, fifth wheelers, and motor homes, have one or more tanks for storing the effluent or wastewater originating in the toilet, sink, or shower. These tanks are typically called black water or gray water tanks. The effluent stored in black water and gray water tanks can easily clog or render inoperable a liquid level measurement apparatus or sensors in direct contact with the wastewater. Examples of typical direct wastewater measurement devices are ones that use conductance, capacitance, floats, or other direct means for measuring the liquid in a tank. Despite the numerous cleaning methods and chemicals that have been developed, many of the existing wastewater level measuring methods and systems can fail within several weeks, resulting in the owner of a recreational vehicle draining the wastewater tank or tanks too frequently or running the risk of a tank overflow.

A typical modern recreational vehicle has a plurality of wastewater holding tanks. There are normally separate tanks for black water (human waste from the toilet) and gray water (waste water from the kitchen sink). There may be a second gray water tank for effluent from a shower.

Indirect liquid level measurement systems exist. One example is U.S. Pat. No. 7,389,688 by John Vander Horst. These devices work, but it was desired to make a simpler purely mechanical device that requires no transducers and is capable of measuring the liquid level in multiple tanks using a single gage.

BRIEF DESCRIPTION OF THE DRAWINGS

The present disclosure is described in conjunction with the appended figures in which:

FIG. 8 shows section A-A of FIG. 7a;

FIG. 9 shows section B-B of FIG. 7a;

It should be understood that the drawings are not necessarily to scale. In certain instances, details that are not necessary for an understanding of the invention or that render other details difficult to perceive may have been omitted. It should be understood that the invention is not necessarily limited to the particular embodiments illustrated herein.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It should be understood that various changes could be made in the function and arrangement of elements without departing from the spirit and scope as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

In one embodiment, the present disclosure provides a device suitable for use with one or more wastewater holding tanks of a recreational vehicle. Wastewater holding tanks are typically located downstream of a toilet, sink, shower, or any other place where water is used to clean something or where water is combined with other fluids or solids. In addition to recreational vehicles, vehicle wastewater holding tanks can be used in other transportable or moving applications such as boats, trains, buses, aircraft, or portable lavatories.

This disclosure discusses transducers and the fact that embodiments of the present invention can be made without using a transducer (i.e. transducer-less). For purposes of this disclosure, a transducer is defined as a device that converts one form of energy to another, where energy types include electrical, mechanical, electromagnetic (including light), chemical, acoustic, or thermal energy. Therefore, an example of a transducer-less device would be one that does not rely on any conversion from mechanical energy to electrical, electromagnetic, chemical, acoustic, or thermal energy.

Figure 1:
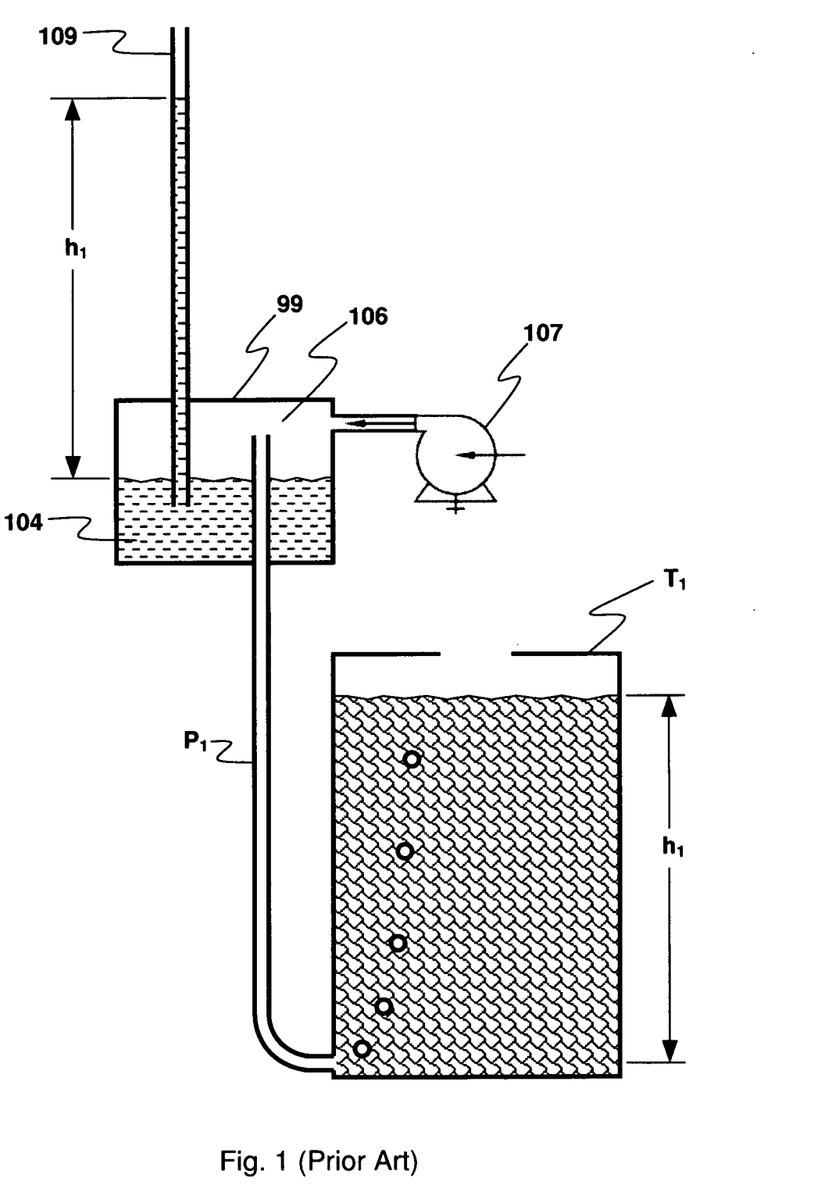
FIG. 1 shows the principle of operation and the prior art.

One embodiment of the present invention relies on the principle that the height of a liquid in a tank can be measured at a distance from such tank by measuring the pressure of a gas induced above the surface of an indicating liquid contained in a suitable gage reservoir, the excess gas being lead by a pipe or tube from the top of the gage reservoir to a point within and near the bottom of the distant tank, so that the pressure on the indicating liquid surface is proportional to the depth of the liquid in the distant tank. This principle is understood in the prior art and is illustrated by FIG. 1 in which a pump 107 pressurizes the air 106 that is part of a sealable vessel 99 that serves as a gage reservoir. This pressurized air 106 has two places to go. It can push the indicator liquid 104 up a manometer tube 109 and it can push air down a pipe $P_1$ until excess air escapes from the distant tank $T_1$. If the liquid in the tank $T_1$ and the indicator liquid 104 have the same density, then the height $h_1$ of the liquid in the manometer tube 109 as measured from the top of the indicating liquid 104 will be the same as the height $h_1$ of the liquid in tank $T_1$ above the inlet of the pipe $P_1$ in the tank $T_1$. Note that the pressure reading does not change with the relative vertical position of the tank $T_1$ and sealable vessel 99. In one embodiment, the present invention applies this principle described in FIG. 1 to an easy-to-fabricate and easy-to-use transducer-less device for measuring the level of multiple wastewater tanks in a vehicle (such as a recreational vehicle) or in a portable application (such as a portable lavatory).

Figure 2:
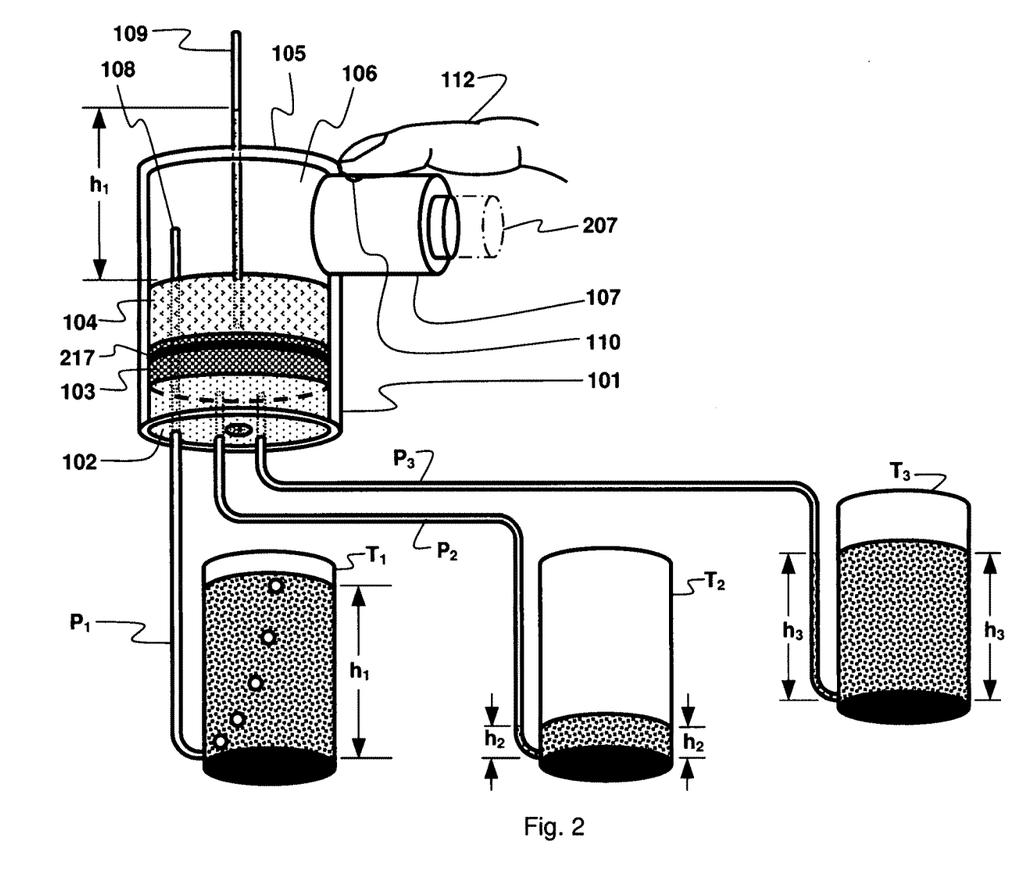
FIG. 2 shows a rotary valve indirect liquid level-measuring device connected to a plurality of wastewater tanks.

FIG. 2 shows a system comprising an embodiment of a rotary valve multi-tank indirect liquid level-measuring device and a plurality of wastewater tanks. Specifically shown are three tanks, labeled $T_1$, $T_2$, and $T_3$, connected with three pipes $P_1$, $P_2$, and $P_3$, respectively, to the measuring device, which comprises all of the other elements shown in FIG. 2. Note that in a typical recreational vehicle application the tanks $T_1$, $T_2$, and $T_3$, will generally be larger, flatter, and more distant from the measuring device than the relative scale of the tanks, pipes, and device depicted in FIG. 2. One end of the pipes $P_1$, $P_2$, and $P_3$ are connected to either the bottom of the tanks $T_1$, $T_2$, and $T_3$, or to the sides of these tanks as close to their bottoms as possible, in order to read as close to the full pressure head of the liquid in the tanks. The other end of the pipes $P_1$, $P_2$, and $P_3$ are connected to a rotary valve module, which is part of the measuring device. The rotary valve module comprises a connection disk, shown at 102. The connection disk 102 is located at the base of the measuring device. The pipes $P_1$, $P_2$, and $P_3$ are typically made of tubing. This tubing can be flexible PVC, it can be some other kind of a flexible or rigid plastic, or it can be some other type of piping capable of being understood by anyone skilled in the art. The tubing may be any length or diameter. However, for performance reasons, one would like to have tubing that has a relatively small internal diameter as this reduces the displacement required by the pump. The lengths of the pipes needed for using a gage of this type in a recreational vehicle can be a minimum of 20 feet.

Also referring to FIG. 2, in one embodiment the rotary valve module of the indirect liquid-level measuring device comprises a cylindrical tube 101, the connection disk 102, a selection disk 103, and a selection disk o-ring 217, all of which are axially aligned with each other. In addition to these rotary valve module components, the rotary valve multi-tank indirect liquid level measuring device comprises an end cap 105, the pressurization source 107, a pressurization tube 108, and a manometer tube 109. The enclosed space in the cylindrical tube 101 between the selection disk 103 and the end cap 105 may be partially filled with the indicator liquid 104 and the multi-tank indirect liquid-level measuring device is oriented so that the remaining volume of the enclosed space between the selection disk 103 and the end cap 105 can serve as the body of a sealable vessel, all elements being pneumatically coupled to the pressurized air 106. Note that the selection disk 103 sits between the enclosed volume or reservoir and the connection disk 102, and on the opposite side of the connection disk 102 than the connections to the pipes $P_1$, $P_2$, and $P_3$. The indicator liquid 104 can be any liquid understood by someone skilled in the art of manometers, examples of which include mercury and water. If water is to be used, a colorant may be added to make the height of the water easier to see in the manometer tube 109. The pressurization source 107 generates the pressurized air 106 that makes the device work. Note that the indicator liquid 104 is typically not necessarily part of the device, but will be added by the user during the installation process.

Further referring to FIG. 2, the pipes $P_1$, $P_2$, and $P_3$, are attached to the connection disk 102 at three points on one end of the cylindrical disk with each of the attachment points being located the same distance from the central vertical axis of the connection disk. The attachment points comprise axial holes through the connection disk that allow air to pass through the connection disk to one of the pipes $P_1$, $P_2$, and $P_3$, when a pressurization tube 108 mounted in the selection disk 103 is rotated to align with the hole in the connection disk 102 opposite that pipe. The selection disk 103 is assembled into the cylindrical tube in a way that allows an operator to rotate the selection disk 103 inside the cylindrical tube. The details of one implementation will be explained later in this disclosure. The pressurization tube 108 that is mounted in the selection disk extends through the indicator liquid 104 to the pressurized air 106.

Additionally FIG. 2 shows the end cap 105 that helps to seal the pressurized air 106 into an enclosed space. The end cap 105 can either be an integral part of the cylindrical tube 101 as illustrated in FIG. 2, or it can be a separate component that is attached to the cylindrical tube 105. The pressurization source 107 shown in FIG. 2, can be a simple single-stroke hand-operated push button positive displacement pump cylinder 207 that, when depressed, pressurizes the air 106. A user's thumb would typically press this push button. There is also a pressure relief hole, shown at 110, which can be sealed by a user's finger, shown at 112 while pressing the push button. Examples of manual (i.e. hand-operated) positive displacement pumps include, but are not limited to piston pumps, pumps that use a bulb (such as a turkey baster), other kinds of squeeze pumps, bellows pumps, and diaphragm pumps. The pump also doesn't need to be limited to one that is operated manually by the operator's hands. Other examples of manual human-operated pumps can include pumps in which the user blows into a tube, presses a footpad, or uses an arm or leg action to crank a handle.

FIG. 2 also illustrates the operation of the system when the first tank $T_1$ has been selected and has its liquid level measured. The first pipe $P_1$ has been selected and pneumatically connected to the volume of air in the device through the pressurization tube 108. The pump button 207 has been depressed from its relaxed state while a pressure relief hole 110 has been manually sealed by a user's finger, causing air to push through the first pipe $P_1$ and create air bubbles in the first tank $T_1$ as excess air escapes. The pressurized air 106 also forces water up the manometer tube 109 making the reading of the pressure head $h_1$ equal to the vertical height of the liquid in the first tank $T_1$ from the point at which the first pipe $P_1$ enters the first tank $T_1$. If the indicator liquid 104 and the liquid in the first tank are both water, or are both liquids having the same densities, the vertical height of the indicator liquid in the manometer tube and the vertical height of the water in the first tank $T_1$ from the point of the inlet of the first pipe $P_1$ will both be the same as shown by the two $h_1$'s in FIG. 2. If liquids of different densities are used, there will be a ratio in the two heights that is directly proportional to the ratio of the densities of the two liquids.

Note that the second pipe $P_2$ and third pipe $P_3$ have liquid in them to the same height as the liquid that is in the respective tanks $T_2$ and $T_3$ because these pipes have not been connected to the pressurized air 106 by the rotary valve that is part of the multi-tank liquid-level measuring device. The volume of liquid in these two pipes $h_2$ and $h_3$, respectively, must be purged if the liquid level were to be measured in these tanks. To minimize the amount of liquid that must be pumped from these pipes it is desirable to minimize the inside diameter of the pipes and to run the pipes directly vertically until they are a sufficient distance above the highest liquid level that could be in any of these tanks. As a reference, the system shown in FIG. 2 has been implemented using pipe that has an inside diameter of 3/32 inch. Other inside diameters such as 1/16 inch and 1/8 inch could also be used for a typical recreational vehicle. If a 3/32 inch inside diameter pipe is used and the length of pipe is 15 inches before it is above the tank, a displacement of 0.1 cubic inches would be required to purge the liquid from the pipe. The method of attachment and sealing of the pipes $P_1$, $P_2$, and $P_3$ to the tanks $T_1$, $T_2$, and $T_3$ and to the connection disk 102 of the measuring device can be accomplished via a mechanical fitting, through ultrasonic bonding, through plastic welding, or through some other means capable of being understood by someone skilled in the art.

Note that the entire indirect liquid level-measuring device shown in FIG. 2 is transducer-less, in that it uses only mechanical energy (in the form of pressure) to provide a reading of liquid levels in a plurality of recreational vehicle wastewater tanks, without converting this to an other form of energy such as electrical, electromagnetic, chemical, acoustic, or thermal energy.

Further referring to FIG. 2 the operation of a push button positive displacement pump can cause the indicating liquid in the manometer tube 109 to overshoot. To prevent this, a flow damper can be placed into the manometer tube 109 close to the point at which the indicator liquid 104 enters the manometer tube 109. Placing a 1/8-inch long plug into the manometer tube 109 at the end close to the inlet for the indicator liquid 104 has been found to work well as a flow damper.

Figure 3:
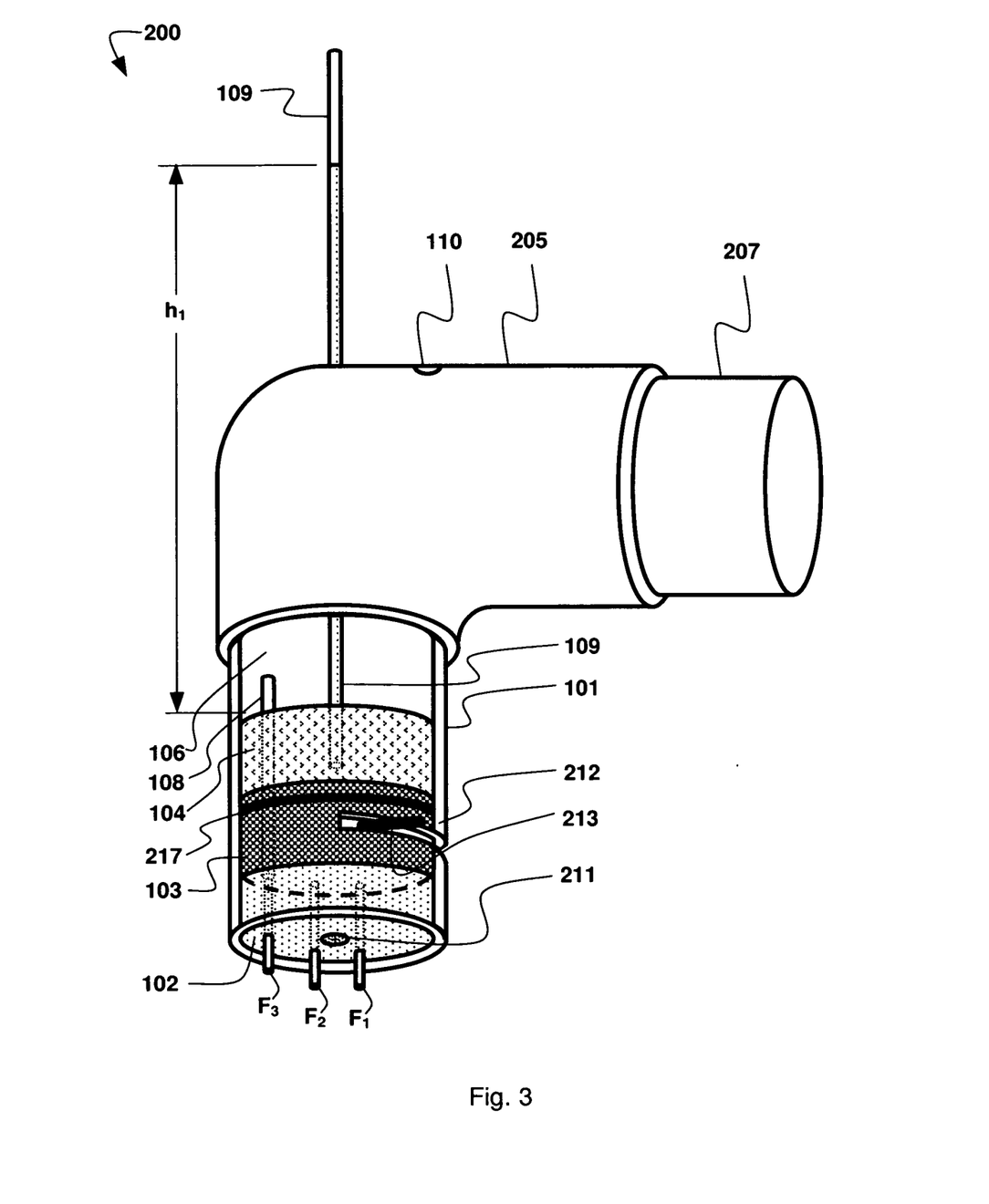
FIG. 3 shows an embodiment of a transducer-less rotary valve multi-tank indirect liquid level-measuring device.
Figure 4:
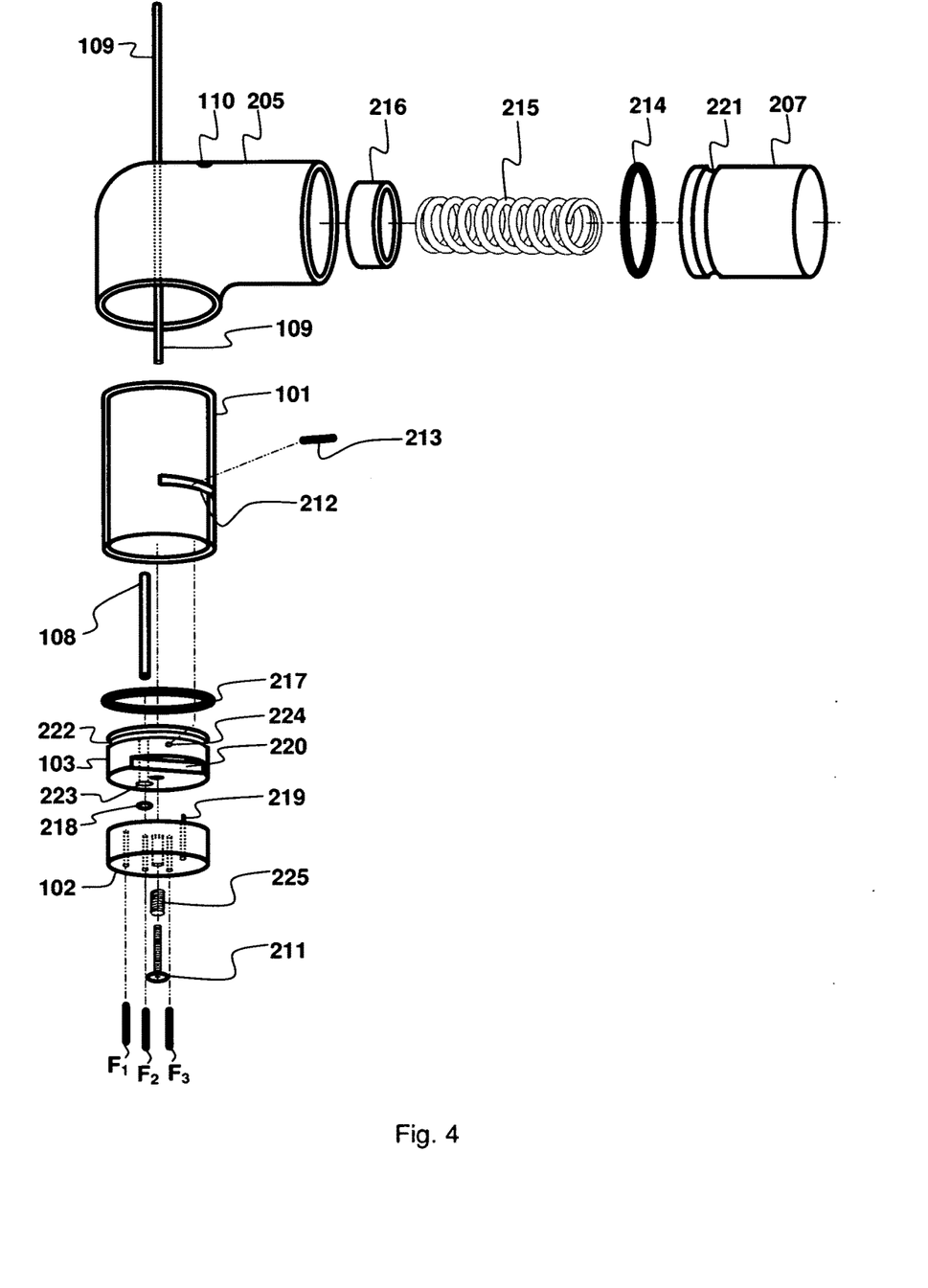
FIG. 4 is an exploded view of the device of FIG. 3.

FIG. 3 and FIG. 4 show another embodiment of a rotary valve indirect liquid level-measuring device at 200. The embodiment shown in FIG. 3 and FIG. 4 is similar to the device shown in FIG. 2, but the tanks and pipes have been removed to reveal more detail of the device. In the device shown in FIG. 3 the end cap (105 in FIG. 2) and the housing for the pressurization source (107 in FIG. 2) have been integrated into a single end cap housing, shown at 205. In this embodiment, the end cap housing 205 is made from a standard 90-degree polyvinyl chloride (PVC) elbow joint that can be obtained at hardware stores. In one specific embodiment, the end cap housing is a 90-degree elbow joint for standard 3/4 inch PVC pipe. This means the inside diameter of the elbow joint is 1.050 inches because 3/4 inch PVC pipe has an inside diameter of approximately 3/4 inch and a wall thickness of approximately 0.15 inches. In the embodiment shown in FIG. 3, one leg of the elbow joint has been reduced in length to fit the cylindrical tube, shown at 101. There is a hole drilled into the elbow for the manometer tube, shown at 109. In the embodiment shown, the manometer tube is made of 1/4 inch outside diameter rigid acrylic tubing with a 1/16 inch wall thickness giving an inside diameter of 1/8 inch. The manometer tube 109 has lines marked on it to show the height of the indicator liquid. In the embodiment shown, the manometer tube hole is drilled so the manometer tube 109 has its one end centered in the center of the indicator liquid, shown at 104. The manometer tube hole and the fitting of the manometer tube into this hole must be done in a way that provides a good seal for the pressurized air 106. This can be done using any technique capable of being understood by someone skilled in the art. One technique is to use a fitting made of pliable PVC tubing that provides a hermetic seal. There are also adhesives that can be used to provide such a hermetic seal.

Further referring to FIG. 3 and FIG. 4, there is a pressure relief hole (or vent) drilled into the elbow, which is shown at 110. This hole serves the same function as the equivalent hole shown in FIG. 2. A pump button, shown at 207 is used to pressurize the air 106. More details of the pump button 207 and other pump elements will be described later in this disclosure. The exact configuration, materials, and manufacturing process for the end cap housing 205 can be anything capable of being understood by someone skilled in the art.

FIG. 3 and FIG. 4 also show the cylindrical tube at 101. The cylindrical tube 101 in this embodiment is made from 0.80 inch inside diameter, 1.05 inch outside diameter transparent PVC pipe that has been cut to a length of approximately 2.5 inches. The cylindrical tube 101 has a cylindrical tube slot, shown at 212, cut into it. In the embodiment shown, the cylindrical tube slot 212 is approximately 0.10 inch wide; it is located about 0.70 inches from one end (the bottom) of the cylindrical tube; and it extends approximately 90 degrees around the circumference of the cylindrical tube 101. The end of the cylindrical tube 101 furthest from the cylindrical tube slot 212 is attached and sealed to the end cap pump housing 205 using any technique capable of being understood by someone skilled in the art. One example of an attachment and sealing technique for the cylindrical tube 101 and end cap housing 205 is the use of an adhesive.

Further referring to the embodiment shown in FIG. 3 and FIG. 4, the selection disk, shown at 103 and the connection disk, shown at 102 are attached to one another using a mechanical fastener, which in this case is an assembly screw, shown at 211. The assembly screw 211 is axially centered in the selection disk 103 and connection disk 102. An assembly spring 225 creates a constant force between the co-axially located selection disk 103 and connection disk 102, while still allowing the two disks to rotate relative to one another. In the embodiment shown in FIG. 3 and FIG. 4, the connection disk 102 has three fittings, shown at $F_1$, $F_2$, and $F_3$ that allow pipes or tubes, shown as $P_1$, $P_2$, and $P_3$ in FIG. 2, from the tanks shown as $T_1$, $T_2$, and $T_3$ in FIG. 1, to attach to the liquid level measuring device 200. These fittings $F_1$, $F_2$, and $F_3$ can also be called connection elements. In the embodiment shown in FIG. 3 and FIG. 4, these fittings $F_1$, $F_2$, and $F_3$ are pressed into axial through holes in the connection disk 102. By rotating the selection disk 103 inside the cylindrical tube 101 and relative to the connection disk 102, the user can exclusively select which of the three fittings $F_1$, $F_2$, or $F_3$ in the connection disk 102 lines up with an axial passage in the selection disk 103, which is then connected to the pressurized air 106. The outside diameters of the connection disk 102 and the selection disk 103 are designed to allow these to disks to fit snugly into the cylindrical tube 101. There is an o-ring grove around the circumference of the selection disk 103 near the end of the selection disk 103 that is opposite the connection disk 102. This groove has an o-ring, shown at 217, placed in it to provide a seal between the pressurized air 106 and outside atmosphere when the selection disk and connection disk are placed inside the cylindrical tube 101. The pressurization tube, shown at 108, is placed into the hole in the selection disk. The pressurization tube 108 extends out the end of the selection disk 103 that is opposite the connection disk 102 and extends through the indicator liquid, shown at 104, to the pressurized air 106.

FIG. 3 and FIG. 4 also show how the selection disk 103 can be rotated when the device 200 has been assembled. There is a hole in the selection disk 103 that lines up with the cylindrical tube slot 212 in the cylindrical tube 101. In the embodiment shown in FIG. 2, a selection disk rotation pin, shown at 213, is pressed into this hole in the selection disk 103. The connection disk 102 is fixed so that it cannot move relative to the cylindrical housing 101, which can be accomplished using any method capable of being understood by someone skilled in the art, such as the use of a pin that goes radially through the cylindrical housing 101 and into the connection disk 102. The selection disk 103 will then rotate relative to the connection disk when a user rotates the selection disk rotation pin 213 relative to the cylindrical housing 101. A rotary valve is created through the combination of the cylindrical selection disk 103 placed in a cylindrical tube 101 with a selection disk rotation pin 213 that is accessed through the cylindrical tube slot 212.

Further referring to FIG. 4, the pump button 207 includes an o-ring groove, shown at 221, into which a pump button o-ring, shown at 214, can be placed. The pump button o-ring 214 helps ensure that there is a good seal for maintaining the pressurized air (106 in FIG. 2 and FIG. 3). There is a coil spring, shown at 215, which becomes compressed when the pump button 207 is pressed. One end of the coil spring 215 is retained inside the pump button 207. A spring support, shown at 216, retains the other end of the coil spring 215. When the device shown in FIG. 4 is assembled, the spring support 216 rests against the manometer tube, shown at 109. The pump button 207, pump button o-ring 214, coil spring 215, and spring support 216 can be made of any materials capable of being understood by anyone skilled in the art. For example, the pump button 207 can be made of machined or molded plastic, the pump button o-ring 214 can be a commercially purchased rubber o-ring, the coil spring 215 can be a commercially purchased plastic or steel spring, and the spring support 216 can be molded or machined ring or cap capable of retaining the coil spring.

FIG. 4 also shows how the manometer tube, shown at 109, and the cylindrical tube, shown at 101, fit into the end cap pump housing 205. The assembly spring, shown at 225, provides a compressive force to ensure that the connection disk 102 and selection disk 103 are always pressed together. A connection tube o-ring, shown at 218, is placed into a selection tube o-ring housing, shown at 223, before the selection disk 103 and connection disk 102 are fastened together. A stop pin, shown at 219, is also placed into a hole in the connection disk before the selection disk 103 and connection disk 102 are fastened together. One end of the stop pin 219 fits into a slot, shown at 220 in the selection disk to limit the amount of rotation between the connection disk 102 and selection disk 103 to the three through holes in the connection disk 102 that line up with the three fittings, shown at $F_1$, $F_2$, and $F_3$, that are pressed into the connection disk 102. A pressurization tube, shown at 108 is pressed into the selection disk 103. A selection disk o-ring, shown at 217, is placed into a selection disk o-ring groove, shown at 222.

Further referring to FIG. 4, the completed subassembly comprising the connection disk 102, the selection disk 103, and various attachments can be placed into the cylindrical tube 101 once the operations described in the previous paragraph have been completed. The completed selection disk+assembly disk subassembly is pushed in far enough so that the selection disk rotation pin hole, shown at 224, is in the cylindrical tube slot, shown at 212, allowing the selection disk rotation pin, shown at 213, to be placed in the selection disk rotation pin hole 224.

Referring to FIG. 3 and FIG. 4, the easiest way to fill the indirect liquid level measuring device with an indicator liquid, shown at 104 in FIG. 3, is to remove the pump button 207 and pump button o-ring 214 in FIG. 3, as well as the coil spring 215 in FIG. 4, and spring support 216 in FIG. 4 from the end cap pump housing 205. The user can then pour the indicator liquid 104 in FIG. 3 directly into the vessel.

Figure 5A:
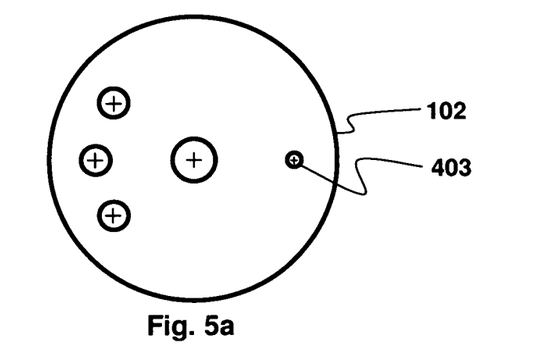
FIG. 5a is a top view of the connection disk of FIG. 3 and FIG. 4.
Figure 5B:
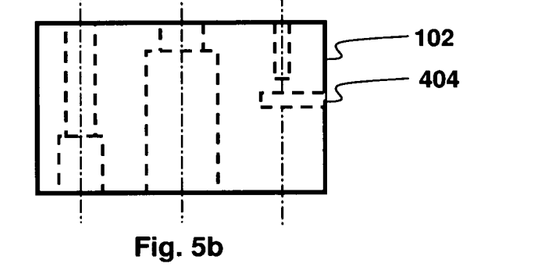
FIG. 5b is a side view of the connection disk of FIG. 3 and FIG. 4.
Figure 5C:
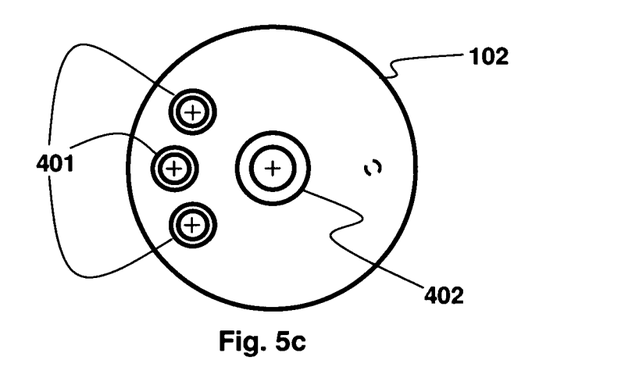
FIG. 5c is a bottom view of the connection disk of FIG. 3 and FIG. 4.

FIG. 5a is a top view of the connection disk 102. FIG. 5b is a side view of the connection disk 102. FIG. 5c is a bottom view of the connection disk 102. These views illustrate the fitting holes, shown at 401, which connect to the three fittings ($F_1$, $F_2$, and $F_3$ in FIG. 4). Both the fittings ($F_1$, $F_2$, and $F_3$ in FIG. 4) and the fitting holes 401 can be called connection elements that provide a pneumatic connection between the wastewater tanks ($T_1$, $T_2$, and $T_3$ in FIG. 2) and the measuring device. The fitting holes 401 are axial through holes in the connection disk 102 and all fitting holes 401 are located at the same fixed radial distance from the central axis of the connection disk. FIG. 5a, FIG. 5b, and FIG. 5c also illustrate the assembly screw hole, shown at 402, that houses the assembly screw (211 in FIG. 4) and assembly spring (225 in FIG. 4). The assembly screw hole 402 is located on the central axis of the connection disk 102. Additionally, FIG. 5a, FIG. 5b, and FIG. 5c illustrate the stop pin hole, shown at 403, which houses the opposite end of the stop pin (219 in FIG. 4). There is also an anti-rotation pin hole shown at 404. The anti-rotation pin hole 404 is used to hold an anti-rotation pin, that will be further described with reference to FIG. 8.

Figure 6A:
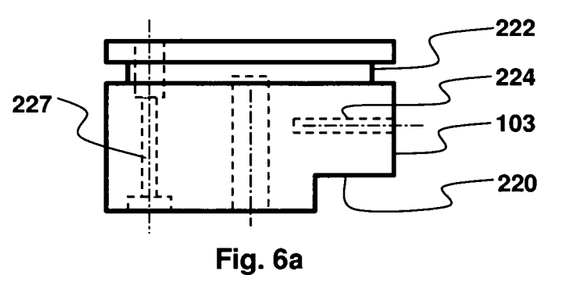
FIG. 6a is a side view of the selection disk of FIG. 3 and FIG. 4.
Figure 6B:
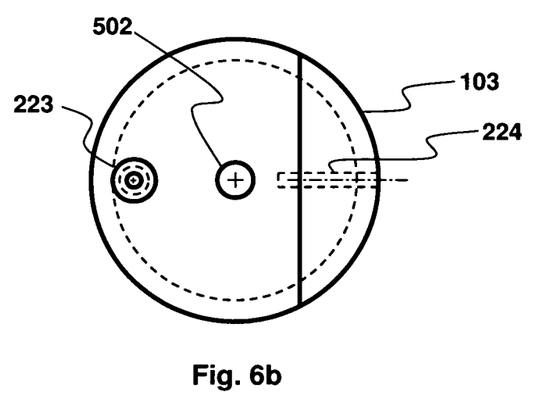
FIG. 6b is a bottom view of the selection disk of FIG. 3 and FIG. 4.

FIG. 6a shows a side view of the selection disk at 103. FIG. 6b shows a bottom view of the selection disk at 103. FIG. 6a and FIG. 6b depict the o-ring groove at 222. FIG. 6a and FIG. 6b depict the connection tube o-ring housing at 223. The connection tube o-ring housing is the bottom of the selection disk axial passage shown at 227 that goes from one end of the selection disk 103 to the other. The selection disk axial passage 227 is at the same radial distance from the central axis of the selection disk as the distance between the central axis and the centers of the axial through holes in the connection disk shown in FIG. 5a, FIG. 5b. and FIG. 5c. FIG. 6a and FIG. 6b depict the selection disk rotation pin hole at 224. FIG. 6a and FIG. 6b depict the assembly screw hole at 502. The selection disk rotation pin hole 224 is a radial hole to hold the selection disk rotation pin, shown at 213 in FIG. 4 in a radial orientation relative to the central axis of the selection disk 103.

Figure 7A:
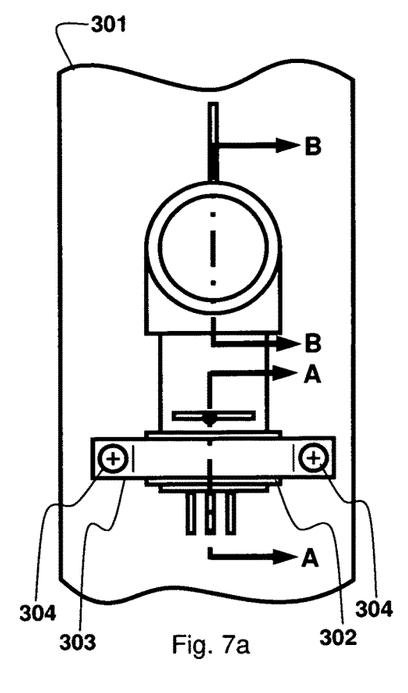
FIG. 7a is a front view of the device of FIG. 3 mounted to a wall.
Figure 7B:
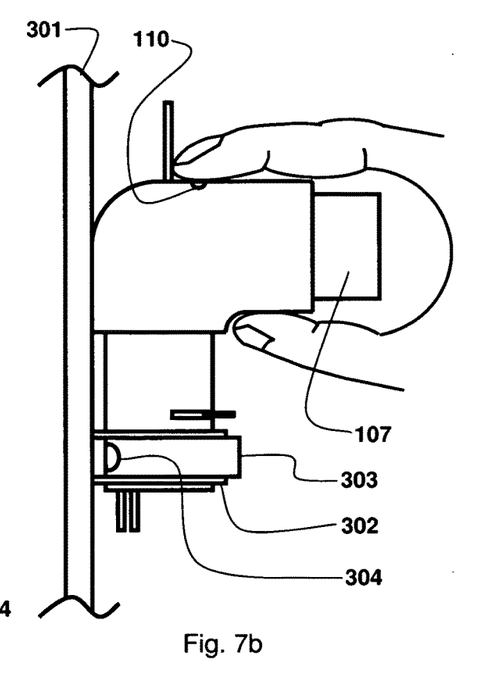
FIG. 7b is a side view of the device of FIG. 3 mounted to a wall.
Figure 7C:
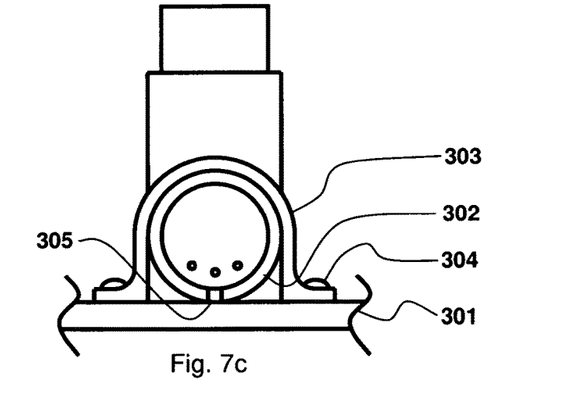
FIG. 7c is a bottom view of the device of FIG. 3 mounted to a wall.

FIG. 7a, FIG. 7b, and FIG. 7c provide three orthogonal views of a liquid level-measuring device mounted on the wall of a recreational vehicle. In these three views, the wall of the recreational vehicle is shown at 301. The device is mounted using a mounting sleeve, shown at 302. The mounting sleeve 301 surrounds the device near the bottom of the device. This sleeve has a slot, shown at 305, which allows the sleeve 302 to fit snugly around the device regardless of tolerances of the device and the sleeve 302. The sleeve is surrounded by a mounting bracket, shown at 303, which is attached to the wall, shown at 301, using two mounting screws, shown at 304.

FIG. 7b also shows how an operator's index finger might be used to seal the pressure relief hole 110. Typically, the thumb of the operator's other hand (not shown) would simultaneously the press the pump button 207 to make a liquid level reading using the embodiment of the device shown.

Figure 8:
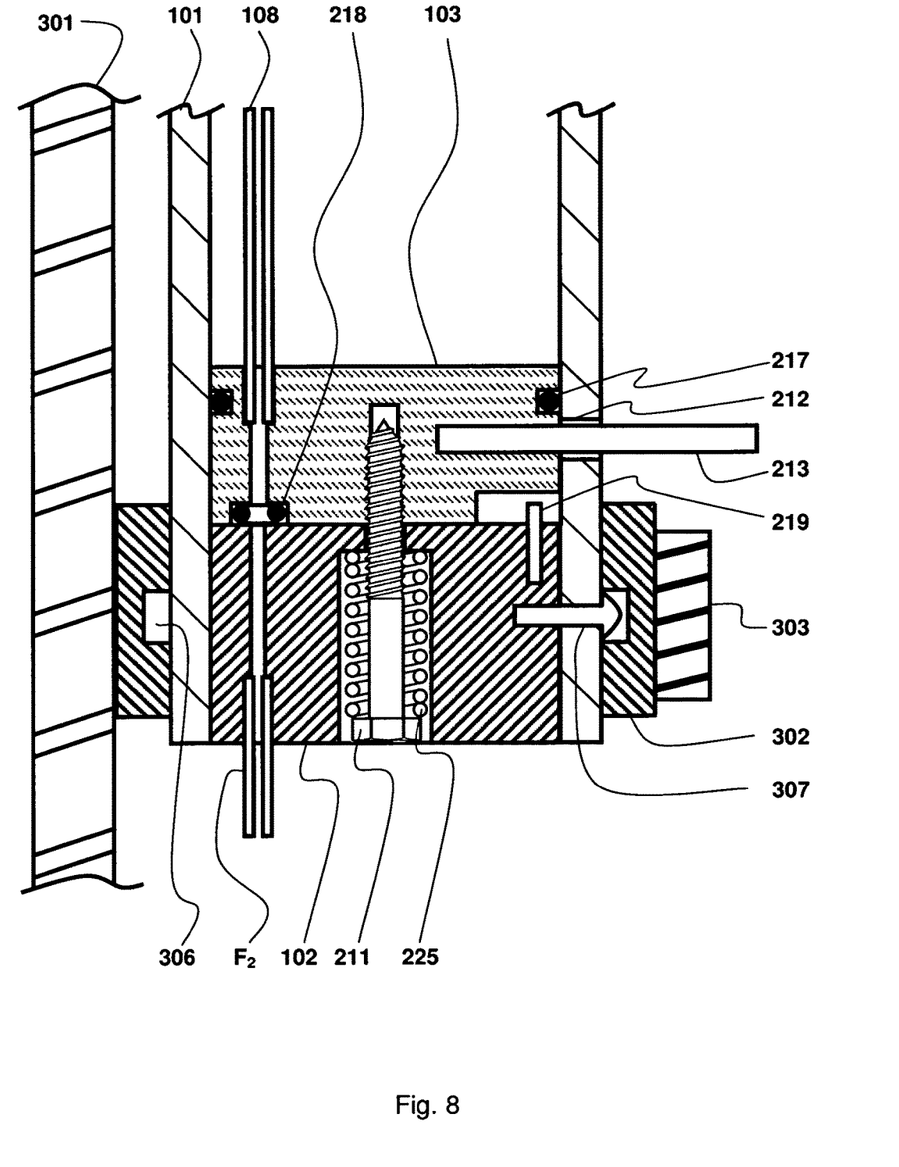

FIG. 8 is section A-A of FIG. 7*a* that shows the wall of the recreational vehicle at 301. The mounting sleeve is shown at 302. There is a groove, shown at 306, in the mounting sleeve 302. This groove 306 facilitates the placement of an anti-rotation pin, shown at 307, that goes through the wall of the cylindrical tube, shown at 101, to prevent the connection disk, shown at 102, from rotating relative to the cylindrical tube 101. Means other than the anti-rotation pin 307 can be used to fixedly and securely attach the connection disk to the cylindrical tube including screws, adhesives, and clamps or any other attachment technique capable of being understood by anyone skilled in the art. The mounting bracket, shown at 303, goes over the mounting sleeve 302. One end of the stop pin, shown at 219, is pressed into the connection disk 102. The selection disk rotation pin, shown at 213, is pressed into the selection disk 203 and is accessible to the user through a slot in the cylindrical tube 101.

Further referring to FIG. 8, the assembly screw, shown at 211, compresses the assembly spring, shown at 225, to provide a pressure that keeps the connection disk 102 pressed against the selection disk 103. This ensures that the connection tube o-ring, shown at 218, provides a proper seal. This seal is needed to ensure that the pressurized air delivered by the fitting, shown at $F_2$, is transmitted to the pressurization tube, shown at 108 without leakage.

Figure 9:
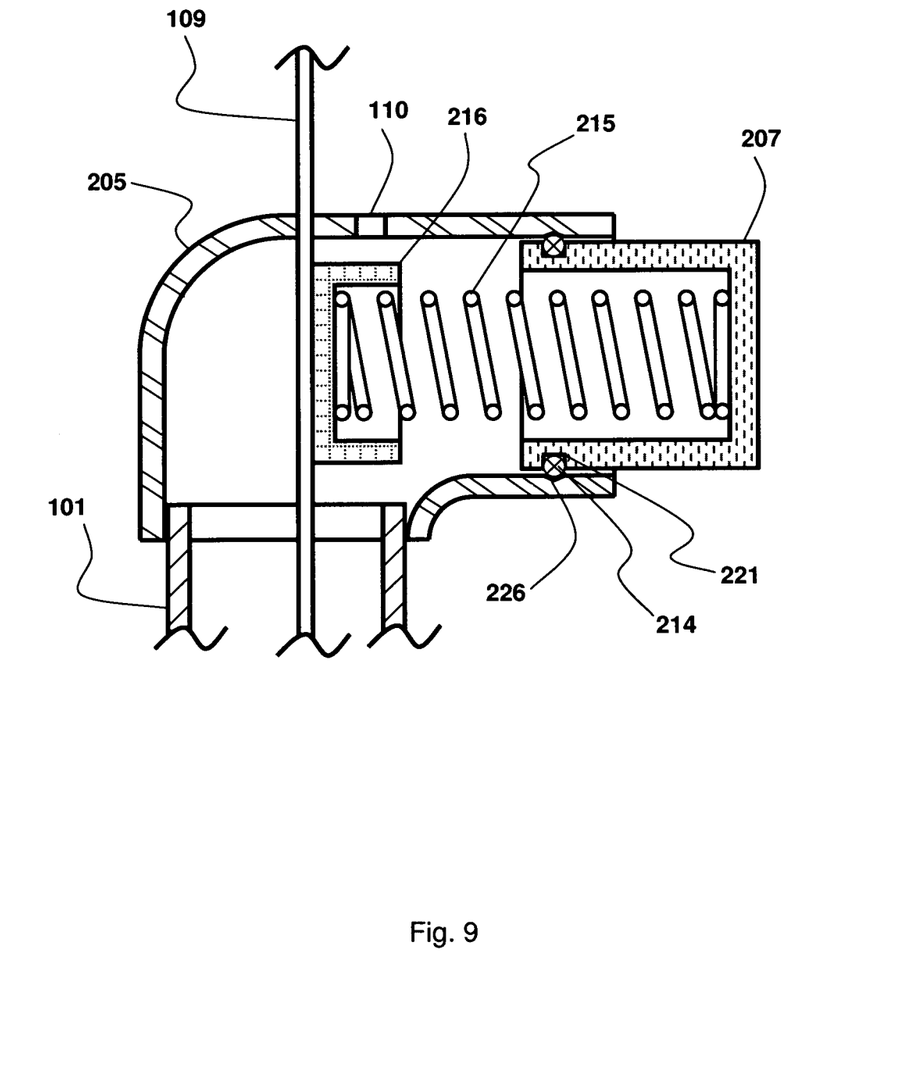

FIG. 9 is section B-B of FIG. 7*a*. This shows the end cap pump housing 205 and pressure relief hole 110. It also shows how the spring cap 216 rests against the manometer tube 109. It further shows the pump spring 215 being compressed between the spring cap 216 and pump button 207. The pump button o-ring 214 rides in the pump button o-ring groove 221. There is also a small ring machined out of the end cap pump housing 205 that helps serve as a pump button o-ring stop shown at 226. Also shown at 101 is a partial section of the cylindrical tube. For reference purposes, one embodiment of the design shown in FIG. 9 has an end cap pump housing inside diameter of approximately 1.05 inches and a pump button stroke of about 0.5 inches giving a displacement in excess of 0.4 cubic inches in a single stroke. The following is a list of minimum pump displacements (Minimum Displacement) needed assuming various choices of pipe inside diameters (Pipe IDs for pipes shown $P_1$, $P_2$, and $P_3$ in FIG. 2), manometer tube (209 in FIG. 2) inside diameters (Tube IDs), and tank heights ($h_1$, $h_2$, and $h_3$ in FIG. 2, heights in list below) that are suitable for various typical recreational vehicles:

| Pipe ID | Tube ID | Height | Minimum Displacement |
|---------|---------|--------|----------------------|
| 1/16"   | 3/32"   | 5 inches | 0.05 cubic inches |
| 1/16"   | 3/32"   | 10 inches | 0.10 cubic inches |
| 1/16"   | 3/32"   | 15 inches | 0.15 cubic inches |
| 1/16"   | 3/32"   | 20 inches | 0.20 cubic inches |
| 1/16"   | 3/32"   | 25 inches | 0.25 cubic inches |
| 3/32"   | 1/8"    | 5 inches | 0.10 cubic inches |
| 3/32"   | 1/8"    | 10 inches | 0.20 cubic inches |
| 3/32"   | 1/8"    | 15 inches | 0.30 cubic inches |
| 3/32"   | 1/8"    | 20 inches | 0.40 cubic inches |
| 3/32"   | 1/8"    | 25 inches | 0.50 cubic inches |

Figure 10:
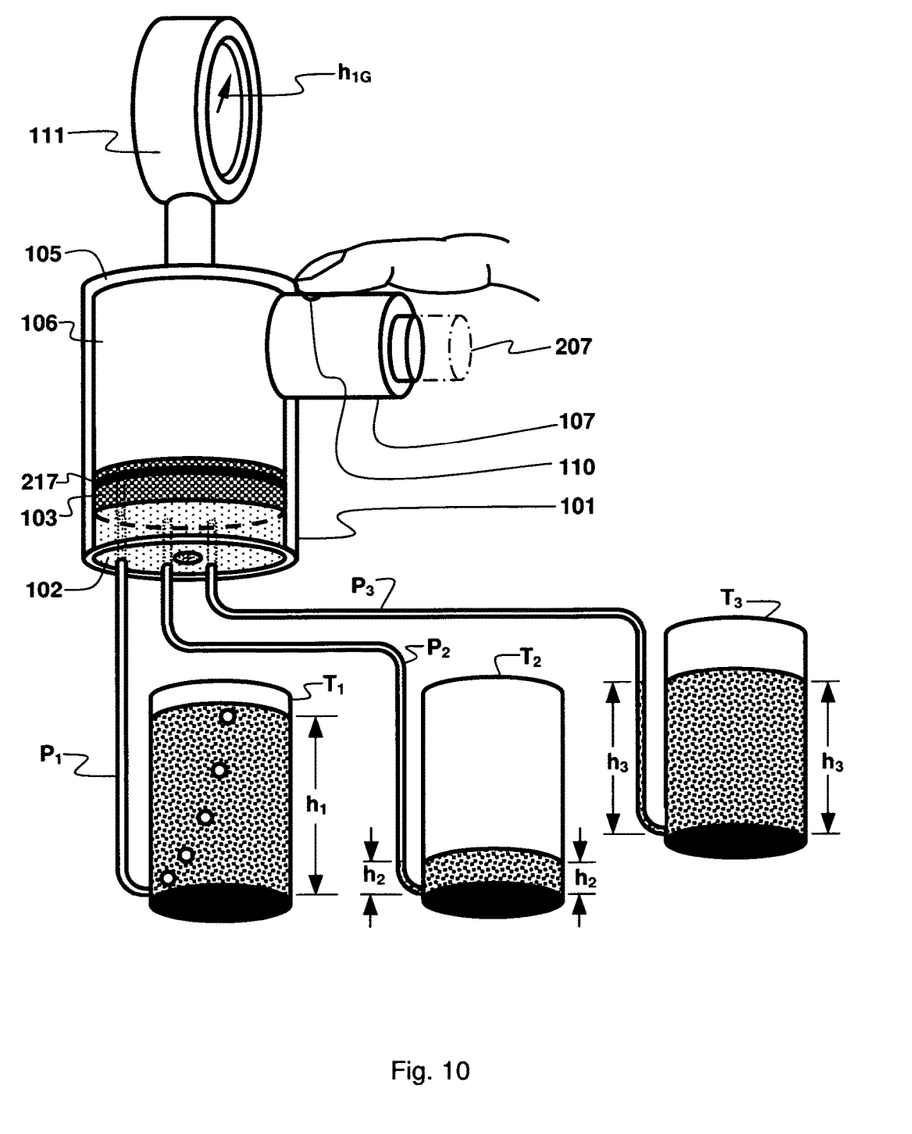
FIG. 10 shows an alternate embodiment rotary valve indirect liquid-level measuring device connected to a plurality of wastewater tanks.

FIG. 10 illustrates and alternate embodiment of a rotary valve multi-tank indirect liquid level measurement device attached to a plurality of wastewater tanks. This alternate device comprises the same cylindrical tube 101, connection disk 102, selection disk 103, selection disk o-ring 217, end cap 105, pressurization source 107, and pressure relief hole 110, to create a sealable reservoir (or vessel) for holding pressurized air 106 that were shown with reference to FIG. 2 and FIG. 3. In FIG. 10, the pressurization source 107 is a manual piston pump that is actuated with a having a pump button (or push button) shown at 207. The rotary valve multi-tank indirect liquid level measurement device does not contain an indicator liquid (104 in FIG. 2) and does not need the pressurization tube (108 in FIG. 2). Because there is no liquid in the reservoir, this alternate rotary value multi-tank indirect liquid level measurement device is not sensitive to orientation, so the central axis of the cylindrical tube does not necessarily need to be vertical. It could also be horizontal. In this alternate device, the manometer tube, 109 in FIG. 2 and FIG. 3, and related elements have been replaced with a bourdon tube pressure gage, shown at 111. The bourdon tube pressure gage 111 comprises a rotary dial that indicates the level of liquid in the recreational vehicle wastewater tank as the a pressure, shown at $h_{1G}$. The bourdon tube pressure gage reading $h_{1G}$ is a measure of the height of the liquid $h_1$ in the first tank $T_1$ because the pressure of the pressurized air 106 is communicated through the axial passage in the selection disk 103 that is aligned with the axial through hole in the connection disk 102 that is connected to the first pipe $P_1$. FIG. 10 also shows the second tank $T_2$, the third tank $T_3$, the second pipe $P_2$, the third pipe $P_3$, the second pressure head $h_2$, the third pressure head $h_3$ are the same as what was shown in FIG. 2.

Figure 11:
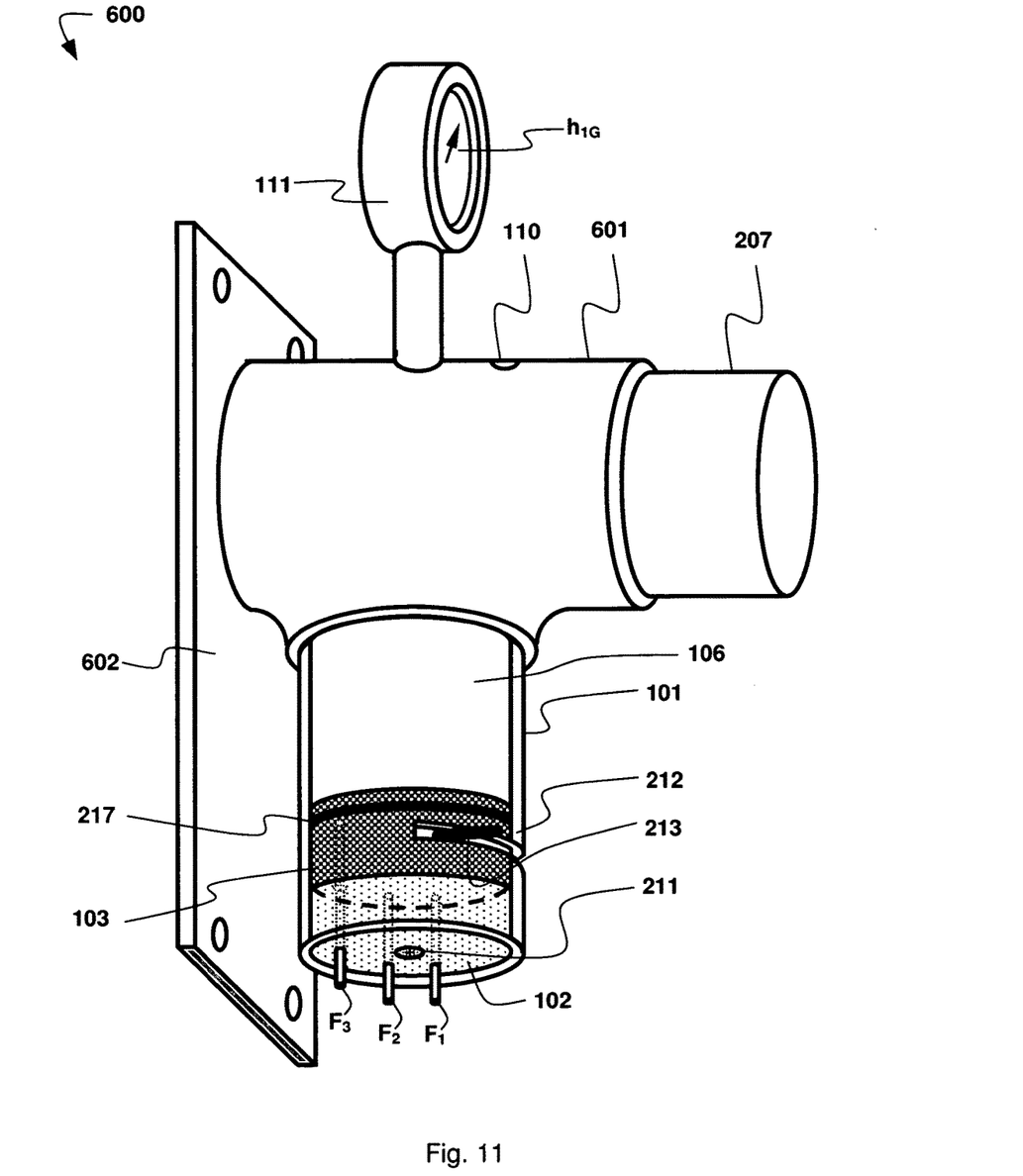
FIG. 11 shows a variant of the alternate embodiment rotary valve indirect liquid-level measuring device of FIG. 10 that further includes a mounting plate.

FIG. 11 shows a variation of the alternate embodiment of a rotary valve multi-tank indirect liquid level measurement device of FIG. 10. This variation of the device is shown at 600. In the variation shown in FIG. 11, the sealable vessel comprises a ¾-inch PVC (polyvinyl chloride) T-connector, shown at 601, that has the manual piston pump button 207 mounted in one of the pipe adapters in the front of the device 600 in a horizontal orientation. The cylindrical tube is 101 mounted on the second of the pipe adapters downwards in a vertical orientation and an end cap mounting plate 602 seals off the third of the pipe adapters, which is located at the rear. This third pipe adapter is in a horizontal orientation. In the variation of the alternate embodiment shown, the end cap mounting plate 601 is a molded PVC part that has a plug that can be bonded into the third pipe adapter of the T-connector 601. The end cap mounting plate 601 has four holes that are designed to facilitate attachment of the device to a wall of the recreational vehicle that has the wastewater tanks. Other parts of this variation of the alternate embodiment device 600 are similar to the items shown in FIG. 3. This includes the pressure relief hole (or vent) 110, the connection disk 102, the selection disk 103, the pressurized air 106, the assembly screw 211, cylindrical tube slot 212, the selection disk rotation pin 213, the selection disk o-ring and the three fittings $F_1$, $F_2$, and $F_3$.

A number of variations and modifications of the disclosed embodiments can also be used. The principles described here can also be used for in applications other than recreational vehicles such as bioreactors, etc. While the principles of the disclosure have been described above in connection with specific apparatuses and methods, it is to be clearly understood that this description is made only by way of example and not as limitation on the scope of the disclosure.

What is claimed is:

1. An apparatus for indicating the depth of liquid in a plurality of recreational vehicle wastewater tanks comprising:

a sealable reservoir for holding pressurized air;
a manual piston pump that pressurizes the air in the reservoir;
a cylindrical tube pneumatically coupled to the sealable reservoir;
a cylindrical connection disk that snugly fits inside the cylindrical tube and is fixedly attached to the cylindrical tube, the connection disk comprising:
   a plurality of axial through holes located at a fixed radius from the connection disk central axis; and
   a connection element in one end of each axial through hole wherein each connection element provides a connection to a pipe that communicates with liquid in the bottom of one of the recreational vehicle wastewater tanks to be gaged;
a cylindrical selection disk that snugly fits inside the cylindrical tube wherein:
   the selection disk is axially aligned and adjacent to the connection disk on the opposite side of the connection disk from the connection elements;
   the selection disk is located between the connection disk and the reservoir;
   the selection disk comprises an axial passage that is located at the fixed radius from the common central axis of the selection disk and connection disk; and
   the selection disk is rotatable in the cylindrical tube to provide selective and exclusive transmission of pressurized air from the reservoir to the recreational vehicle wastewater tanks; and
a bourdon tube pressure gage that senses the pressure difference between the pressurized air and atmospheric pressure and displays the pressure difference to indicate the depth of the liquid in one of the recreational vehicle wastewater tanks.

2. The apparatus of claim 1 wherein:
the common central axis of the selection disk and the connection disk is vertical;
the selection disk further comprises a selection disk o-ring groove;
the apparatus further comprises an o-ring located in the selection disk o-ring groove that seals the pressurized air in the reservoir from atmospheric pressure;
the selection disk rotates in the cylindrical tube when a radial pin is manually moved, wherein the radial pin fits into a slot in the cylindrical tube;
the connection disk is attached to the selection disk with a screw and a coil spring;
the sealable reservoir is sealed by manually sealing a drilled hole in the reservoir; and
the apparatus operates without using electrical, electromagnetic, chemical, acoustic or thermal energy.

3. The apparatus of claim 1 wherein:
the connection elements comprise fittings for PVC tubes wherein the PVC tubes comprise an inside diameter selected from the group of 1/16 inch, 3/32 inch, and 1/8 inch; and
the pump is a single stroke hand pump displacing a minimum volume selected from the set of 0.05 cubic inches, 0.1 cubic inches, 0.15 cubic inches, 0.2 cubic inches, 0.25 cubic inches, 0.3 cubic inches, 0.4 cubic inches, and 0.5 cubic inches.

4. The apparatus of claim 1 wherein:
the common central axis of the selection disk and the connection disk is vertical.

5. The apparatus of claim 1 wherein:
the axial passage comprises a connection tube o-ring housing;
the apparatus further comprises an o-ring located in the connection tube o-ring housing;
the selection disk comprises a slot; and
the slot limits the amount of rotation of the selection disk relative to the connection disk.

6. The apparatus of claim 1 wherein:
the reservoir comprises polyvinyl chloride.

7. The apparatus of claim 1 wherein:
the pump further comprises a push button, an o-ring, and a coil spring.

8. The apparatus of claim 1 wherein:
the connection element comprises a mechanical fitting.

9. The apparatus of claim 1 wherein:
the cylindrical tube is transparent.

10. The apparatus of claim 1 wherein:
the apparatus further comprises a mounting plate that the mounting plate comprises wall mounting holes.

11. The apparatus of claim 1 wherein:
the apparatus does not use electrical, electromagnetic, chemical or thermal energy to indicate the depth of liquid in the plurality of recreational vehicle wastewater tanks.

12. The apparatus of claim 1 wherein:
the connection disk is attached to the selection disk with a mechanical fastener.

13. A multi-tank wastewater level gage comprising:
a sealable vessel for holding pressurized air;
a pump for pressurizing the air in the vessel;
a rotary valve pneumatically coupled to the sealable vessel wherein the rotary valve further comprises:
   a cylindrical housing;
   a cylindrical connection disk that snugly fits inside the cylindrical housing and is fixedly attached to the cylindrical housing, the connection disk comprising:
      a plurality of axial through holes located at a fixed radius from the connection disk central axis; and
      a connection element in one end of each axial through hole wherein each connection element provides a connection to a pipe that communicates with liquid in the bottom of one of the wastewater tanks to be gaged;
   a cylindrical selection disk that snugly fits inside the cylindrical housing wherein:
      the selection disk is axially aligned and adjacent to the connection disk on the opposite side of the connection disk from the connection elements;
      the selection disk is located between the connection disk and the vessel;
      the selection disk comprises an axial passage that is located at the fixed radius from the common central axis of the selection disk and connection disk; and
      the selection disk is rotatable in the cylindrical housing to provide selective and exclusive transmission of pressurized air from the vessel to one of the wastewater tanks; and
a pressure gage that senses the pressure difference between the pressurized air and atmospheric pressure and displays the pressure difference to indicate the depth of the liquid in one of the wastewater tanks.

14. The gage of claim 13 wherein:
the gage is used in a recreational vehicle; and
the pump is a manual piston pump comprising a push button, an o-ring, and a coil spring.

15. The gage of claim 13 wherein:
the pressure gage is a bourdon tube pressure gage.

16. The gage of claim 13 wherein:
the selection disk central axis and the connection disk central axis are vertically aligned;
the vessel comprises a ¾ inch T-connector made of polyvinyl chloride; and
the gage further comprises an end cap mounting plate wherein:
the mounting plate seals one of the openings of the T-connector; and
the mounting plate comprises a feature for attachment to a wall.

17. The gage of claim 13 wherein:
the selection disk rotates in the cylindrical housing when a radial pin is manually moved, wherein the radial pin fits through a slot in the cylindrical housing; and
the connection disk is attached to the selection disk with a screw and a coil spring.

18. A mechanical method of displaying the level of liquids in a plurality of remote wastewater tanks comprising the steps of:
pressurizing a sealable vessel with pressurized air;
establishing a pneumatic connection between a selection disk and the pressurized air;
transmitting the pressurized air through an axial passage in the selection disk;
establishing a connection element that has a plurality of axial through holes in a circular configuration;
connecting a first end of each axial through hole with a pneumatic connection to the bottom of a wastewater tank;
attaching the central axis of the selection disk to the center of the circular configuration of the connection element on the side of the connection element opposite the pneumatic connections to the bottoms of the wastewater tanks, wherein attaching comprises an attachment that allows the selection disk to rotate about its central axis;
rotating the selection disk relative to a connection element to align the selection disk passage with one end of one of the axial through holes, whereby a pneumatic connection is made between the pressurized air and a wastewater tank;
displaying the air pressure using a bourdon tube pressure gage.

19. The method of claim 18 wherein:
the wastewater tanks are located in a recreational vehicle;
the method further comprises manually sealing the sealable vessel by plugging a hole prior to pressurizing the vessel;
pressurizing comprises a manual piston pump.

20. The method of claim 18 wherein:
rotating comprises manually moving a pin that protrudes radially from the selection disk;
connecting comprises flexible polyvinyl chloride tubing having a maximum inside diameter of ⅛ inch whereby the total volume of air to be displaced is minimized.

\* \* \* \* \*